No. 633,100. Patented Sept. 12, 1899.
G. A. NORCROSS.
CHURN.
(Application filed Apr. 4, 1898.)

(No Model.) 2 Sheets—Sheet 1.

WITNESSES
John Buckler,
L. M. Muller

INVENTOR
George A. Norcross
BY
Edgar Tate & Co
ATTORNEYS

No. 633,100. Patented Sept. 12, 1899.
G. A. NORCROSS.
CHURN.
(Application filed Apr. 4, 1898.)
(No Model.) 2 Sheets—Sheet 2.
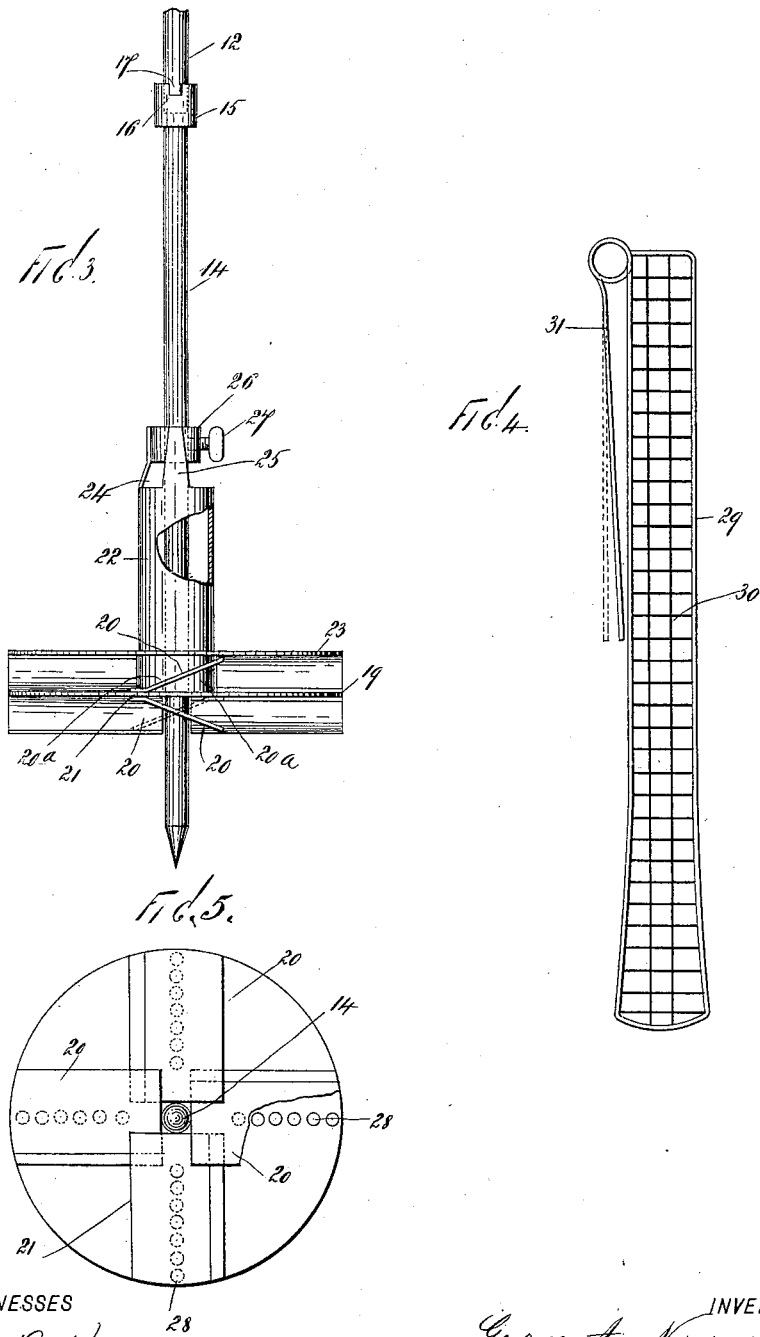
WITNESSES
John Buckler,
L. M. Muller
INVENTOR
George A. Norcross.
BY
Edgar Tate & G
ATTORNEYS
THE NORRIS PETERS CO., PHOTO-LITHO., WASHINGTON, D. C.

UNITED STATES PATENT OFFICE.

GEORGE A. NORCROSS, OF NEW YORK, N. Y.

CHURN.

SPECIFICATION forming part of Letters Patent No. 633,100, dated September 12, 1899.

Application filed April 4, 1898. Serial No. 676,436. (No model.)

*To all whom it may concern:*

Be it known that I, GEORGE AVERY NORCROSS, a citizen of the United States, residing at New York, in the county of New York and State of New York, have invented certain new and useful Improvements in Churns and Dashers, of which the following is a full and complete specification, such as will enable those skilled in the art to which it appertains to make and use the same.

This invention relates to dashers and operative mechanism therefor; and the object thereof is to provide an improved dasher and improved means for operating the same, and which are particularly adapted for use in connection with churns, but which may be used in connection with ice-cream freezers, beaters, and other and similar machines.

Another object of my invention is to provide an improved dasher which is vertically adjustable and which is designed to produce a partial vacuum at the bottom of the vessel in which it is placed by repelling the liquid in the vessel or driving it toward the sides thereof, said vacuum being supplied by air admitted through a tubular stem connected with the dasher, said vessel being also provided with deflectors or breakers employed in connection with the dasher to counteract the centrifugal action of the latter and force the liquid inward or toward the axis of the dasher.

My present invention is an improvement on that described and claimed in United States Patent No. 581,609, granted April 22, 1897, and is fully disclosed in the following specification, of which the accompanying drawings form a part, in which—

Figure 1:
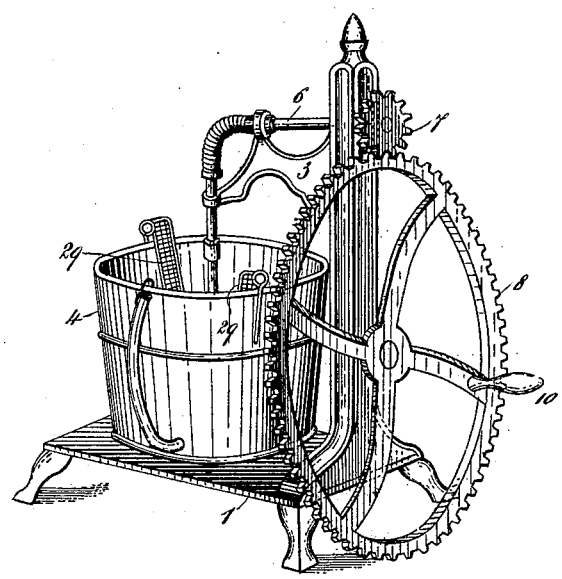
Figure 2:
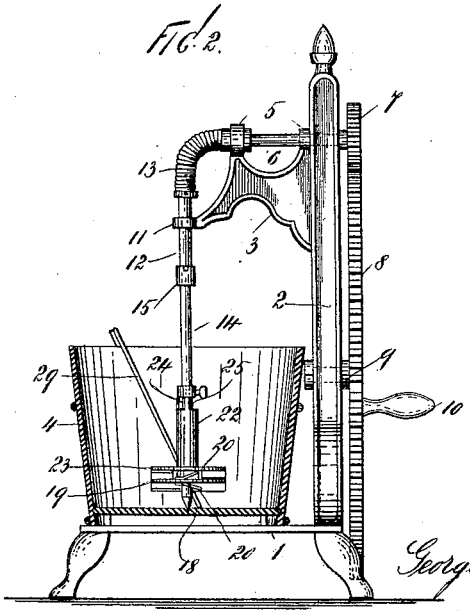

Figure 1 is a perspective view of my improved churn; Fig. 2, a sectional side elevation; Fig. 3, a side view of the dasher and the dasher-shaft, part of the construction being broken away; Fig. 4, a side view of one of the deflectors or breakers which I employ; and Fig. 5, a bottom plan view of the dasher, showing one of the wings connected therewith broken away.

In the drawings forming part of this specification the separate parts of my improvement are designated by the same numerals of reference in each of the views, and in the practice of my invention I provide a suitable table or support 1, to one side of which is connected a vertical standard 2, which is provided at its upper end with a substantially horizontal arm 3, which projects over the table or support 1 and also over a churn, tub, or similar receptacle 4 placed thereon. The arm 3 is provided with bearings 5, in which is mounted a drive-shaft 6, the outer end of which passes through the standard 2 and is provided with a pinion 7, which is operated by a large power-wheel 8, mounted on a stub-shaft 9, secured to the standard 2, said wheel 8 being provided with a handle or crank 10, by which it is operated. The arm 3 is also provided with a horizontal bearing 11, through which passes a supplemental vertical drive-shaft 12, and the vertical shaft 12 is connected with the horizontal drive-shaft 6 by means of a flexible and expansive coupling-shaft 13, similar to that described and claimed in the patent hereinbefore referred to, the main function of the latter being to convey rotary motion from the drive-shaft, which is arranged in a horizontal position, to a dasher-shaft 14, which is arranged in a vertical position within the churn, and to hold the same in said position and keep it seated on its support.

The dasher-shaft 14 is provided with a cylindrical head 15, in which is formed a transverse groove or recess 16, which is adapted to receive a corresponding lug or projection 17 on the supplemental vertical drive-shaft 12, as clearly shown in Fig. 3, and the lower end of the dasher-shaft 14 is pointed and adapted to rest on the bottom of the tub, churn, or other receptacle 4, as shown at 18, or in a pivotal support connected therewith.

My improved dasher consists of a bottom disk 19, which is provided on its opposite sides with deflecting blades or wings 20, which are secured thereto radially thereof, both on the upper and lower sides thereof, the free edge of said wings or blades on each side being all preferably turned in the same direction, and the said bottom disk 19 is provided centrally with an upwardly-directed tubular stem 22, to which is secured a circular top plate 23, which also forms a part of the dasher and the lower surface of which touches or rests upon the upwardly and backwardly directed wings or blades 20, which are secured to the top of the bottom disk 19. The tubular stem 22 of the dasher is provided between said disks with ports or passages 20ª and at the upper end thereof with slots or openings 24, and the arms or upwardly-directed extensions 25 thus formed are secured to a collar 26, through which the dasher-shaft 14 passes, and said collar is provided with a set-screw 27, by means of which the dasher may be vertically adjusted on the dasher-shaft 14, said shaft being passed downwardly through the tubular stem 22 and the disks 19 and 23. The said bottom disk 19 of the dasher is also provided with four radial rows of perforations 28, which are covered by deflecting wings or blades 20, and in the operation of the device as the dasher is revolved by the wheel 8 and the intermediate gearing the liquid contents of the churn or tub 4 are forced by the radial wings or blades 20 outwardly around the inner walls of the tub or churn, whereby a partial vacuum at the bottom thereof around the dasher-shaft is produced, the said liquid being carried outwardly by centrifugal force, as will be readily understood. The air necessary to supply the vacuum produced by the dasher is admitted through the tubular stem of the dasher, said air entering through the ports or passages formed by the slots 24 at the upper end of said stem, and in order to counteract the centrifugal force and cause the liquid contents to be thrown back on the dasher I employ deflectors or breakers 29, which consist of strong wire frames, as shown in Fig. 4, provided with bodies 30 of wire-netting, and each of these deflectors or breakers is provided at its upper end with a spring-arm 31, and said deflectors or breakers are connected with the top of the tub, as shown in Figs. 1 and 2, said spring-arms being passed down outside of the top, while the deflectors or breakers are arranged at an angle inside thereof, the inclination of said deflectors or breakers being downward and forward in the direction of the rotation of the dasher, and these deflectors or breakers are composed of open wirework in order that they may not offer too great resistance to the movement of the liquid within the body of the churn, and said deflectors or breakers operate to throw the contents of the churn inwardly, and thereby counteract the centrifugal action and prevent the dasher from being exposed, and the air inducted by the action of the dasher in passing upward through the contents of the churn to escape at the top thereof is forced to pass through the liquid contents and in so doing to separate the butter from the milk or cream.

Any desired number of the deflectors or breakers 29 may be employed, and by making the dasher vertically adjustable on the dasher-shaft I facilitate the operation thereof, and it will be understood that the stem 22 of the dasher should be long enough to prevent the ports or passages 24 at the upper end thereof from being covered by the contents of the churn.

My improved dasher may be successfully operated by turning it in either direction; but when turned in the direction in which the wings or blades 20 project greater power will be required than when said dasher is turned in the opposite direction and the vacuum around the dasher will be more quickly produced.

It will be also understood that the dasher-shaft 14 is always held in proper position by the supplemental drive-shaft 12 and the flexible and expansible coupling-shaft 13, and my improved dasher is simple in construction and operation and may be employed in connection with ice-cream freezers and similar devices, and it will be apparent that changes in and modifications of the construction herein described may be made without departing from the spirit of my invention or sacrificing its advantages.

Having fully described my invention, I claim as new and desire to secure by Letters Patent—

In a churn, the combination with a suitable vessel, of a vertical and detachable dasher-shaft, and means for rotating the same, a dasher comprising two disks, the lower of which is provided with radial openings, a tubular stem connected with the bottom disk and passing through the upper disk, and provided with ports or passages between said disks, said stem being connected at its upper end with said shaft and being provided with openings in the upper portion thereof, said lower disk being also provided with radial obliquely-mounted blades on both sides thereof and projecting in the same direction and through the vertical planes in which lie the radial openings of said lower disk, substantially as shown and described.

In testimony that I claim the foregoing as my invention I have signed my name, in presence of the subscribing witnesses, this 31st day of March, 1898.

GEORGE A. NORCROSS.

Witnesses:
L. M. MULLER,
M. A. KNOWLES.